(12) United States Patent
Van Der Wolf et al.

(10) Patent No.: US 7,870,347 B2
(45) Date of Patent: Jan. 11, 2011

(54) DATA PROCESSING SYSTEM (75) Inventors: Pieter Van Der Wolf, Eindhoven (NL); Josephus Theodorus Johannes Van Eijndhoven, Eindhoven (NL); Johannes Boonstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 127 days.

(21) Appl. No.: 10/570,236

(22) PCT Filed: Aug. 19, 2004

(86) PCT No.: PCT/IB2004/051491

§ 371 (c)(1), (2), (4) Date: Feb. 28, 2006

(87) PCT Pub. No.: WO2005/026964

PCT Pub. Date: Mar. 24, 2005

(65) Prior Publication Data

US 2007/0028038 A1     Feb. 1, 2007

(30) Foreign Application Priority Data

Sep. 4, 2003   (EP)   ................................. 03103293

(51) Int. Cl.
*G06F 12/00* (2006.01)
*G06F 13/00* (2006.01)
*G06F 13/28* (2006.01)

(52) U.S. Cl. ........................ 711/151; 711/168; 710/110

(58) Field of Classification Search ................ 710/110; 711/151, 168
See application file for complete search history.

(56) References Cited

U.S. PATENT DOCUMENTS 5,261,067 A   11/1993   Whelan (Continued)

FOREIGN PATENT DOCUMENTS

EP   0294890 A2   12/1988

(Continued)

OTHER PUBLICATIONS

International Search Report of International Application No. PCT/IB2004/051491 Contained in International Publication No. WO2005026964.

*Primary Examiner*—Stephen C Elmore
*Assistant Examiner*—Mark A Giardino, Jr.

(57) ABSTRACT

The disclosed data processing system comprises a memory means (SDRAM), a plurality of data processing means (IP) provided for accessing to said memory means (SDRAM), and a communication interface means coupled between said memory means (SDRAM) and said plurality of data processing means (IP), said communication interface means including a network of nodes (H 11, H 12, H2), each node comprising at least one slave port (s) for receiving a memory access request from a data processing means (IP) or from a previous node and at least one master port (m) for issuing a memory access request to a next node or to said memory means (SDRAM) in accordance with the memory access request received at said slave port (s), wherein said at least one slave port (s) is connected to a master port (m) of a previous node or to one of said data processing means (IP) and said at least one master port (m) is connected to a slave port (s) of a next node or to said memory means (SDRAM).

12 Claims, 4 Drawing Sheets

U.S. PATENT DOCUMENTS

| | | | |
|---|---|---|---|
| 5,440,698 A * | 8/1995 | Sindhu et al. | 709/225 |
| 6,202,097 B1 * | 3/2001 | Foster et al. | 709/238 |
| 6,253,290 B1 | 6/2001 | Nakamoto | |
| 6,282,708 B1 | 8/2001 | Augusteijn et al. | |
| 6,292,705 B1 | 9/2001 | Wang et al. | |
| 7,024,506 B1 * | 4/2006 | Harrington | 710/243 |
| 2002/0188811 A1 * | 12/2002 | Ma et al. | 711/151 |
| 2003/0028747 A1 * | 2/2003 | Denneau et al. | 711/206 |

FOREIGN PATENT DOCUMENTS

| | | |
|---|---|---|
| GB | 2233480 A | 1/1991 |

* cited by examiner

DATA PROCESSING SYSTEM

FIELD OF THE INVENTION

The present invention relates to a data processing system comprising a memory means and a plurality of data processing means provided for accessing to said memory means.

BACKGROUND OF THE INVENTION

Such a system is usually called a multi processor system wherein the data processing means operate to some extent independently from each other and carry out certain processes. The plurality of data processing means have access to the memory means so that the memory means is shared by the plurality of data processing means. Usually, only a single common memory means is provided in such a data processing system, and the plurality of data processing means are provided on a single common chip, whereas the memory means resides outside such chip as an off-chip memory. As the internal details of said processing means are outside the scope of this invention, they will simply be referred to as intellectual property (IP) means.

Figure 1:
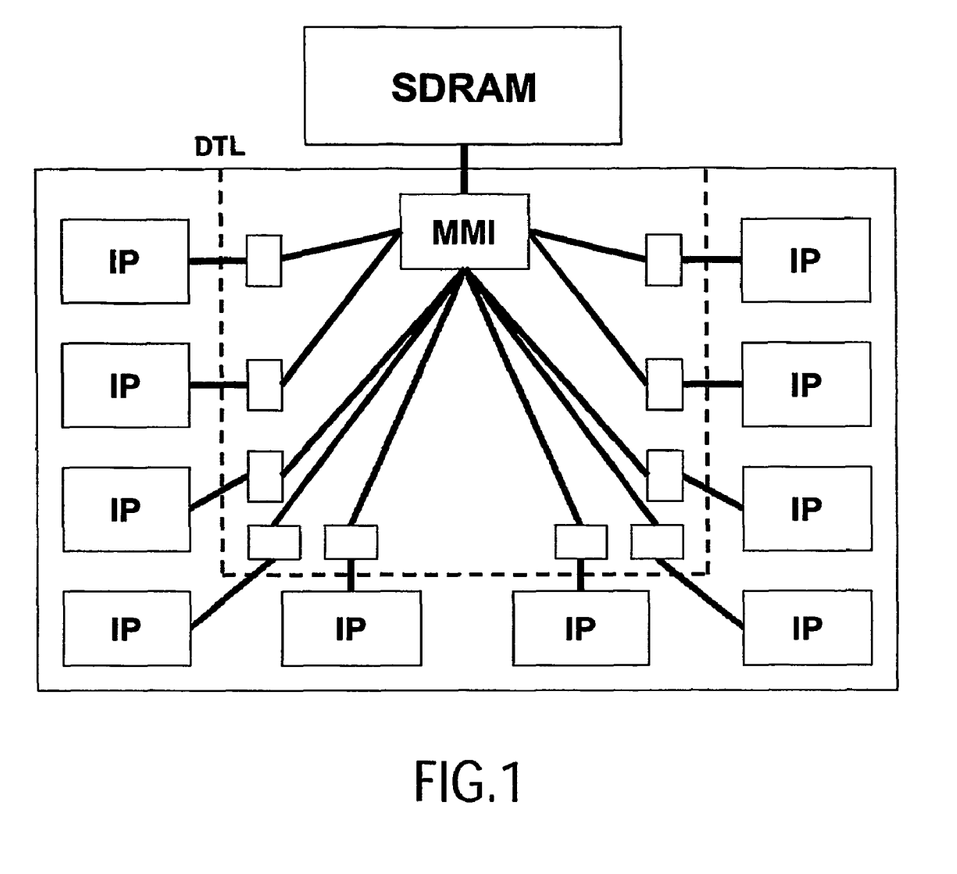
FIG. 1 shows a schematic basic block diagram of a DVP system in its basic form according to the prior art.

As an example of such a shared-memory data processing system, a digital video platform (DVP) system in its basic form is shown in FIG. 1. It comprises a plurality of data processing units IP which communicate via an off-chip memory SDRAM. The data processing units IP can be programmable devices like CPUs, application-specific hardware blocks, subsystems with a complex internal structure etc. Further provided in the system of FIG. 1 is a device transaction level (DTL) interface DTL via which each data processing unit IP is interfaced to a central main memory (MMI) interface MMI which arbitrates the accesses to the off-chip memory SDRAM. All IP-to-IP communication is done via logical buffers (not shown) mapped in the off-chip memory SDRAM. Usually, one of the data processing units IP is a CPU (central processing unit) which manages the configuration of a task graph by programming the data processing units via a network of memory mapped configuration registers (not shown). A synchronization among the data processing units IP is also handled in a centralized way by this CPU which notifies the data processing units IP via the memory mapped input/output network whether full or empty buffers are available. The data processing units IP notify the CPU via interrupt lines (not shown) whether these buffers have run empty or have been filled.

The mechanism used for synchronization results in that the buffers provided in the off-chip memory SDRAM must be rather large in order to keep the rate of the interrupts to the CPU low. For example, video processing units often synchronize at a coarse grain (e.g. a frame) even though from a functional perspective they could synchronize at a finer grain (e.g. a line).

Since such a data processing system comprises a shared memory architecture, there is a single address space which is accessible to all data processing means. This simplifies the programming model. Further, the common memory means helps to provide cost-effective system solutions.

However, such a data processing system in its basic form has a number of disadvantages which will become more eminent as technology progresses. Namely, as the number of data processing means increases, the number of connections to the memory interface increases resulting in a more complex memory interface. In particular, the arbitration among the different data processing means becomes more complex. Further, wire length may become a problem for the data processing means which are located far from the memory interface so that many long wires may cause wiring congestion as well as time delay and power consumption problems. A further critical disadvantage is that there is a potential bottleneck when bandwidth requirements increase further; the bandwidth to the (off-chip) memory means is restricted by certain aspects like signalling speed and pin count of the off-chip interconnect.

GB 2 233 480 A discloses a multi-processor data processing system wherein each processor has a local memory. The local memories together form the main memory of the system, and any processor can access any memory, whether it is local to that processor or remote. Each processor has an interface circuit which determines whether a memory access request relates to the local memory or to a remote memory, and routes the request to the appropriate memory, wherein remote requests are routed over a bus. Whenever a write access is made to the local memory, a dummy write request is routed over the bus to all the other processors. Each processor monitors all write requests on the bus, and if a copy of the location specified in the request is held in a local cache memory, such copy is invalidated so as to ensure cache consistency.

U.S. Pat. No. 5,261,067 A discloses an apparatus and a method for ensuring data cache content integrity among parallel processors. Each processor has a data cache to store results of intermediate calculations. The data cache of each processor is synchronized with each other through the use of synchronization intervals. During entry of a synchronization interval, modified data variables contained in an individual cache are written back to a shared memory. The unmodified data contained in a data cache is flushed from the memory. During exiting of a synchronization interval, data variables which were not modified since entry into the synchronization interval are also flushed. By retaining modified data cache values in the individual processors which computed the modified values, unnecessary access to shared memory is avoided.

U.S. Pat. No. 6,253,290 B1 describes a multiprocessor system having a plurality of processor units each including a CPU and a local cache memory connected to the CPU. The CPUs have their shared bus terminals connected to a global shared bus, and local cache memories have their bus terminals connected to a global unshared bus. The global shared bus is connected to an external shared memory for storing shared information used in common by the CPUs, and the global unshared bus is connected to an external unshared memory for storing unshared information used by the CPUs.

U.S. Pat. No. 6,282,708 B1 discloses a method for structuring a multi-instruction computer program as containing a plurality of basic blocks which each compose from internal instructions and external instructions organized in an internal directed acyclic graph. A guarding is executed on successor instructions which each collectively emanate from a respectively associated single predecessor instruction. A subset of joined instructions which converge onto a single join/target instruction are then unconditionally joined. This is accomplished by letting each respective instruction in the subset of joined instructions be executed under mutually non-related conditions, specifying all operations with respect to a jump instruction, specifying all operations which must have been executed previously and linking various basic blocks comprising subsets of successor instructions in a directed acyclic graph which allows parallel execution of any further subset of instructions contained therein.

SUMMARY OF THE INVENTION

An object of the present invention is to overcome the above mentioned drawbacks and to improve the data processing system so as to avoid a communication bottleneck between the data processing and the memory means even when the bandwidth requirements increase further, to decrease the number of connections to the memory interface, and to reduce the wire length.

In order to achieve the above and further objects, according to the present invention there is provided a data processing system comprising a memory means and a plurality of data processing means provided for accessing to said memory means, characterized by a communication interface means coupled between said memory means and said plurality of data processing means, said communication interface means including a network of nodes, each node comprising at least one slave port for receiving a memory access request from a data processing means or from a previous node and at least one master port for issuing a memory access request to a next node or to said memory means in accordance with the memory access request received at said slave port, wherein said at least one slave port is connected to a master port of a previous node or to one of said data processing means and said at least one master port is connected to a slave port of a next node or to said memory means.

Due to the construction according to the invention, the number of connections to the memory means is reduced. This is achieved by the provision of a specific physical organisation of a logically shared memory architecture wherein the communication interface means includes a network of a plurality of nodes having slave ports receiving memory access requests from the data processing means and at least one master port issuing a specific memory access request to the memory means. Typically, the number of master ports of a node is smaller than the number of slave ports of that node. As a result, the complexity of the memory interface is decreased since the number of clients connected thereto is reduced. Further, due to the interconnection of the communication interface means, the length of individual wires and, thus, the total length of wires are reduced so as to help avoiding wire congestion.

The communication interface means includes a network of a plurality of node means, wherein each node means comprises at least one slave port for receiving a memory access request and at least one master port for issuing a memory access request in accordance with the memory access request received at said slave port(s), wherein the number of said slave ports can be higher than the number of said master ports. So, the communication interface means according to the present invention includes a node structure for the connections between the data processing means and the memory means wherein multiple data processing means can be connected to a node means via its slave ports, whereas each node means has only one or a few master ports. Since the slave ports of a node means are uniform in that they offer the same services, it is transparent to the node means whether a slave port attaches a data processing means or another node means. A request for a memory access issued by a data processing means is passed to one of the node means to which it is connected. An advantage of the concept of the invention is that it can be introduced in a step-wise manner. Namely, a first chip to adopt the concept of the invention could use a new node means for just a few data processing means; and in later chips, the number of node means may gradually rise, and the facilities of the communication interface means of the invention may be used for more and more communication between data processing means. In case a node means has multiple master ports, a single port is selected for forwarding, for example, in accordance with an address range discrimination.

In a first embodiment of the invention, each of the slave ports of said node means is connected to one of said plurality of data processing means and the master ports of said node means are coupled to said memory means. So, all the node means are provided in the same level, and the data processing means are coupled to the memory means via such single level of node means. The data processing means can issue memory access requests to an associated node means which forwards the request to the memory means.

In an alternative second embodiment, the network of node means is hierarchically structured having the data processing means as leaves and the node means as nodes.

The plurality of node means can be arranged in a directed acyclic graph structure. Each edge of the directed acyclic graph structure corresponds to an interconnect path which serves memory access requests. The edges are directed, and each edge connects a master port of one node means to a slave port of another node means. In case the memory means includes a plurality of memory sections, the acyclic graph structure can result in a set of master ports each providing a connection to a different memory section, in such a way that each data processing means can communicate to one or more memory section(s), thereby allowing multiple data processing means to access different memory sections concurrently, thereby reducing the bandwidth bottleneck. Furthermore, the acyclic graph structure might provide several different paths through the graph leading from one data processing means to one memory section. These different paths can be employed advantageously to further reduce communication bottlenecks or to avoid the use of faulty connections.

Further, in a preferred refinement of the above embodiment, the plurality of node means may be arranged in a tree structure so that one or more data processing mean(s) and/or previous node(s) are connected to a node means via its slave ports, but each node means has only one master port. This simplifies the forwarding process in the node means and provides connectivity to a single memory section at the root of the node tree that can be accessed by all data processing means.

In this alternative second modification, preferably the plurality of node means include n groups of node means with $n \geq 2$, wherein each of the slave ports of the node means of a first group is connected to one of said plurality of data processing means, the master ports of the node means of the $n^{th}$ group are coupled to said memory means, and each of the slave ports of the node means of the $n^{th}$ group is connected to the master port of the node means of the $(n-1)^{th}$ group. So, the plurality of node means are divided into n groups, wherein each group defines a different level in the structure. If a node means receives a memory access request at one of its slave ports, the request is forwarded to a node means of a higher group or, if the node means is in the highest (i.e. $n^{th}$) group, to the memory means. With the respect thereto, it should be added that the node structure does not necessarily need to have a uniform depth. Some data processing means may be "close" to the memory means in that only one or two nodes separate them from the memory means, whereas (at the same time) other data processing means may be more "remote" from the memory means in that the memory access requests that they issue have to travel via a large number of nodes.

The above mentioned hierarchical structure of the node means is completely transparent to the data processing means so that no modifications of the data processing means are required.

Preferably, the node means are hubs.

In a further preferred embodiment of the invention, at least one local memory unit is attached to the communication interface, allowing such local memory unit to be selectively accessed to by a memory access request. So, a single address space is distributed over a global memory and such local memory unit(s). The advantage of this embodiment is that the data processing means may exchange data to each other via a local memory unit only instead of using the global memory, resulting in a further reduction of a potential bottleneck risk in the communication, by reducing memory access latency, reducing power consumption, and reducing the use of external memory bandwidth.

Preferably, at least one node means further comprises at least one memory port to which a local memory unit is connected. So, the node means checks whether or not the memory access request refers to the local memory unit(s) attached to such node means by comparing the address of the memory access request with the address ranges associated to the local memory unit(s) attached to such node means. If yes, the memory access is executed on the selected local memory unit. Otherwise, the node means forwards the memory access request through one of its master ports either to a next node means where the check and "access or forward" is repeated if a local memory unit is also attached to such next node means, or to the memory means.

In a modification of the recently mentioned embodiment, the communication interface means includes a cache controller means for controlling the local memory unit(s) as a cache memory. In this case at least a part of the local memory unit is used to locally store a copy of data residing in other memories reachable via one of its master ports. So, memory access requests can be served locally for a wider address range for which caching behaviour is enabled.

Moreover, the communication interface means may include at least one synchronization means for streaming communication between data processing means. In particular, at least one node means includes said synchronization means for streaming communication between the data processing means directly or indirectly coupled to said node means.

In case a local memory unit is attached to the node means, the local memory unit should have a first-in/first-out (FIFO) function, and the synchronization means comprises a FIFO administration means for controlling said local memory unit(s). The synchronization services can be locally handled when the FIFO administration is locally stored, whereby multiple data processing means can communicate data via the local memory unit(s) attached to the node means; otherwise the synchronization request is forwarded to one of the master ports of the corresponding node means.

In a further preferred embodiment, the communication interface means is provided on a single chip. Moreover, at least a part of the plurality of data processing means may be additionally provided on said single chip.

The above described objects and other aspects of the present invention will be better understood by the following description and the accompanying figures.

BRIEF DESCRIPTION OF THE DRAWINGS

Preferred embodiments of the present invention are described with reference to the drawings in which.

DESCRIPTION OF PREFERRED EMBODIMENTS

Figure 2:
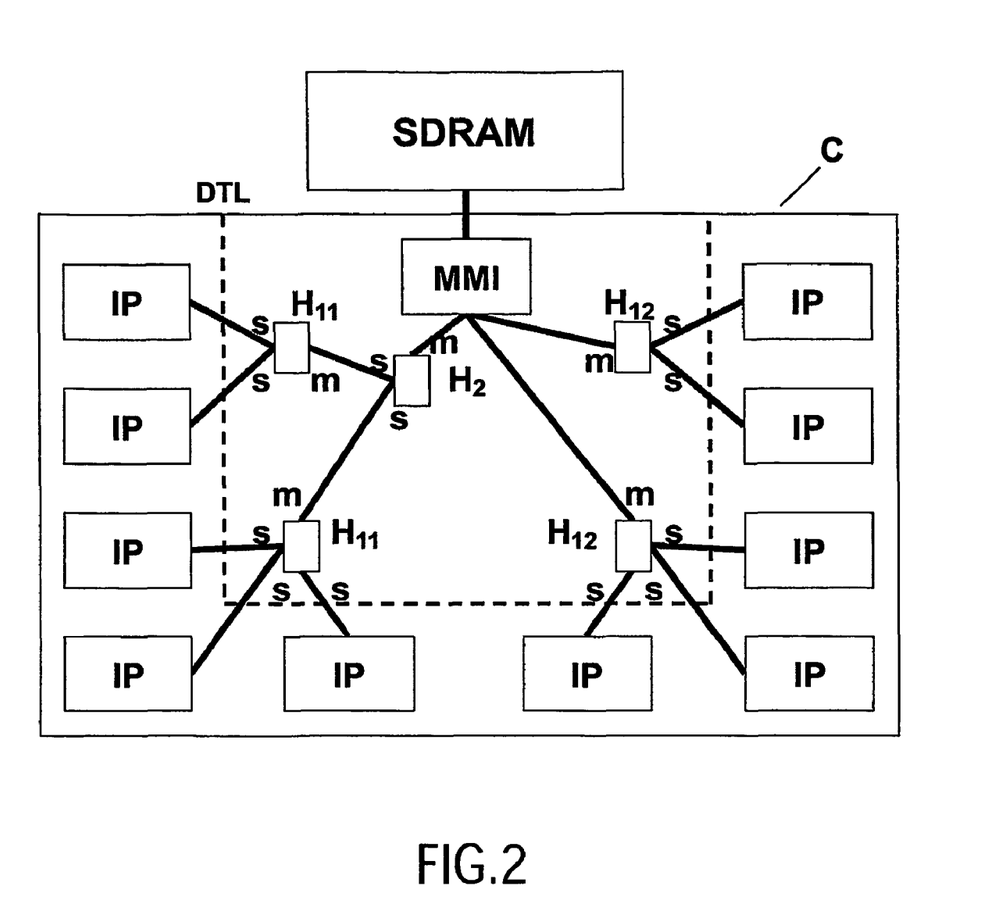
FIG. 2 shows a schematic basic block diagram of a DVP system including a hub structure according to a first preferred embodiment of the present invention.

FIG. 2 shows a digital video platform (DVP) system having a hub structure according to a first preferred embodiment of the present invention. Like the system shown in FIG. 1, the system of FIG. 2 comprises a plurality of data processing units IP, which may also be called intellectual property (IP) units, and a memory SDRAM. The data processing units IP can be programmable devices (CPUs), application-specific hardware blocks, subsystems with a complex internal structure etc. All data processing units comprise a device transaction level (DTL) interface. Further, there are provided a plurality of hubs $H_{11}$, $H_{12}$, $H_2$, wherein each hub comprises several slave ports s and one master port m. In the system of FIG. 2, the hubs define a network of hubs comprising a first group of hubs $H_{11}$ and $H_{12}$ and a second group consisting of only one hub $H_2$. The first group of hubs $H_{11}$ and $H_{12}$ define a first level adjacent to the data processing units IP so that the hubs $H_{11}$ and $H_{12}$ of the first group are directly connected to the data processing units IP via its slave ports s. In the embodiment of FIG. 2, each hub has only one master port m for connection to the next hub or the memory interface MMI. The hubs $H_{11}$ of the first group are connected via its master ports m to the slave ports s of the hub $H_2$ of the second group which is connected via its master port m to the memory interface MMI whereas the hubs $H_{12}$ of the first group are directly connected via its master ports m to the memory interface MMI. The memory interface MMI is coupled to the memory SDRAM.

In the embodiment of FIG. 2, the network of hubs is organized as a directed acyclic graph (DAG) structure wherein the nodes of the DAG structure are defined by the hubs $H_{11}$, $H_{12}$ and $H_2$, and each edge of the DAG structure corresponds to an interconnect path which serves memory access requests. The edges are directed. The DAG structure shown in FIG. 2 is restricted to have a tree structure wherein each hub $H_{12}$, $H_{11}$ and $H_2$ has one master port only. This simplifies the forwarding process in the hubs, as they do not need to select a master port for each memory request, for example by discriminating ranges on the requested address.

At the slave ports s of the hubs a memory access request is received which is forwarded by the master port m. The slave ports s of a hub are uniform in that they offer the same services. Therefore, it is transparent to the hub whether a slave port s is connected to a data processing unit IP or another hub.

It is noted that many modifications of the structure over the embodiment of FIG. 2 are possible and that FIG. 2 gives only one example. So, the network of hubs may include more than two levels. Further, the hubs $H_{12}$ may be connected to a next hub higher in the structure. Moreover, a hub may have multiple master ports wherein a single master port is selected for forwarding, for example in accordance with an address range discrimination.

As further shown in FIG. 2, the data processing units, the device transaction level DTL, the hubs $H_{11}$, $H_{12}$ and $H_2$ and the memory interface MMI reside on a single chip C, whereas the memory SDRAM is provided outside the chip C.

Due to the hub structure shown in FIG. 2, the number of clients of the memory interface MMI is reduced. Further, the length of individual wires and, thus, the total length of wires are reduced whereby wire congestion is avoided.

The hierarchical hub structure is completely transparent to the data processing units IP, and no modifications of the data processing units IP are required. Also it does not affect the way synchronization is performed; this may still be handled in a centralized way by means of a memory mapped input/output (not shown) and interrupts via a data processing unit including a CPU.

Figure 3:
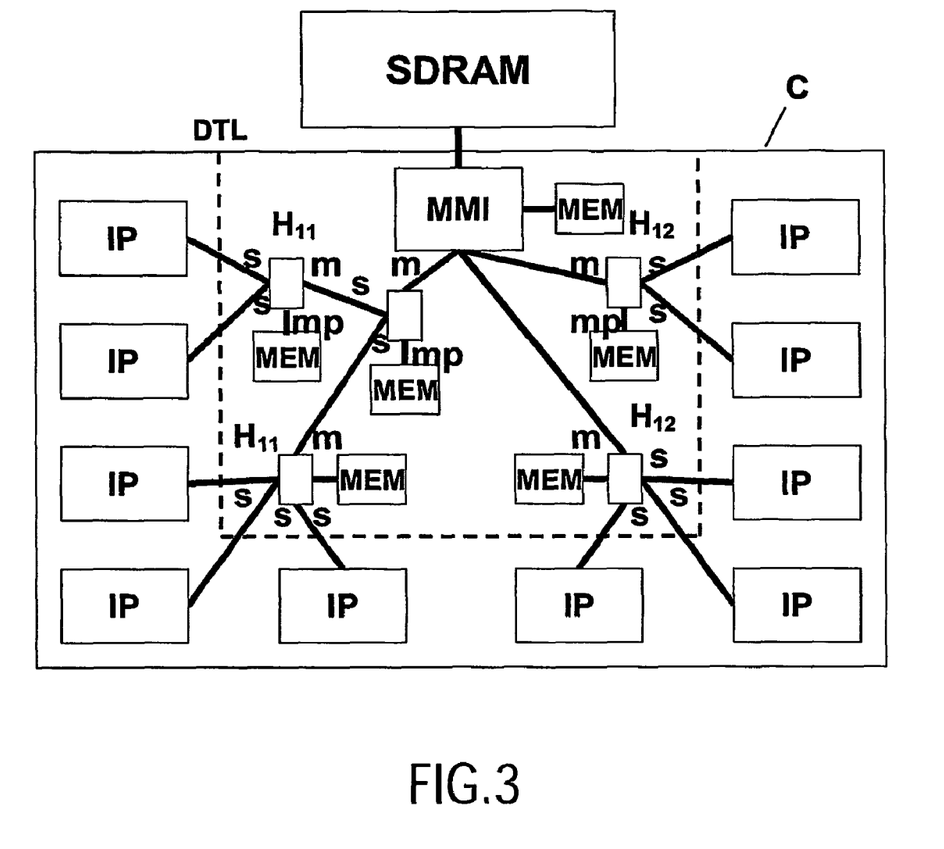
FIG. 3 shows a schematic basic block diagram of a DVP system with a hub structure according to a second preferred embodiment of the present invention which further includes on-chip local memories.

FIG. 3 shows a second preferred embodiment of the present invention which differs from the first embodiment of FIG. 2 in that an embedded local memory MEM is attached to each of the hubs. However, with respect thereto it should be noted that in an alternative embodiment local memories are provided for only some of the hubs. The local memories MEM are assigned private segments in the address space; wherein a single address space is provided which is distributed over the off-chip memory SDRAM and the multiple local memories MEM. The data processing units IP perform memory access requests in the usual address-based way, wherein an address can refer to the off-chip memory SDRAM or to an on-chip local memory MEM. All data processing units IP are able to access the off-chip memory SDRAM and a further on-chip local memory MEM attached to the memory interface MMI, but not all data processing units IP are able to access all on-chip local memories MEM attached to the hubs $H_{11}$, $H_{12}$ and $H_2$. Namely, the data processing units IP can access only the local memories MEM attached to the hubs on the route to the memory interface MMI.

For the data processing units IP sharing a common hub, a buffered communication can be performed via the local memory MEM attached to that hub. A first-in/first-out (FIFO) buffer used for a communication between the data processing units is mapped to a memory segment of the local memory MEM attached to a common hub, preferably to the common hub $H_{11}$ or $H_{12}$ of the first group being the closest common hub. The data processing units IP are simply instructed to access the data in the address range in which such buffer has been allocated via their DTL interface, but are unaware of the physical location; this is transparent to the data processing units IP. The hubs check the addresses of the memory access requests performed by the data processing units IP and either perform an access to their local memory MEM, if the address is in the specified range, or forward the request up in the hierarchy. The buffers for the IP-to-IP communication can be allocated to the local memories MEM upon configuration, wherein the address range of the buffer is programmed in the hub to which the local memory MEM is attached.

The IP-to-IP communication which is mapped to a communication via an on-chip local memory MEM does not consume expensive bandwidth to the off-chip memory SDRAM. The hub structure should be chosen such that the data processing units IP which need to communicate frequently have a common hub for a communication via the local memory attached to such common hub. For example, video data processing units IP should be in the same sub-tree of the hub structure. Moreover, the total available memory bandwidth is increased significantly. In parallel to accesses to the off-chip memory SDRAM by some data processing units IP, accesses to the on-chip local memories may be performed by data processing units IP located in other (disjunct) sub-trees. Further, the communication via the on-chip local memories MEM is more power efficient and can more easily support higher bandwidth (wider interconnects and memory ports, higher clocks).

As explained above, the data processing units IP can simply access data via their DTL interface, irrespective of whether or not that data is located on-chip (local memory MEM) or off-chip (memory SDRAM). Hence, on-chip communication is transparent to the data processing units IP. This facilitates re-use of the data processing units IP in the proposed configuration.

Special attention should be paid to the synchronization among the data processing units IP. As already mentioned above, in the DVP system synchronization is performed by a data processing unit including a CPU, requiring low rate synchronization at a coarse data grain. This results in larger buffer sizes which can easily be accommodated in the off-chip SDRAM. For on-chip communication, however, smaller buffers should be used, which requires synchronization at a finer data grain. For the functions performed by many data processing units, synchronization at a finer grain (e.g. line or macro block) is merely logical. However, using an interrupt-based scheme for synchronization at a finer grain would lead to a higher interrupt rate on the CPU.

One solution may be to dedicate more CPU power to synchronization or even to dedicate a special (light-weight) CPU to the synchronization task.

Another attractive solution is to add synchronization support to the hubs. In this case, each hub can perform the synchronization tasks which are related to the (FIFO-based) IP-to-IP communication via the local memory MEM attached to such hub; i.e., per first-in/first-out operation the availability of data and room is administered and signalled to the data processing units IP. As an effect, this supports continuous (autonomous) operation of the data processing units without CPU software intervention, at least as far as communication via local memories is involved.

It is proposed that the data processing units IP need to make abstract synchronization calls at their ports. The infrastructure decides how these synchronization calls are resolved, dependent on how the data processing unit IP is integrated in a system-on-chip. This would not be hardwired in a re-usable data processing unit. For example, if such a port maps to local communication via a local memory, the corresponding hub resolves the synchronization call locally or forwards it to the next higher hub. If the communication is done via the off-chip memory SDRAM, an interrupt may be generated. For the data processing unit IP this is hidden by an "abstract" interface (not shown) which is configured such that it offers a function to the data processing units IP to issue high level requests to the communication interface, but hides from the data processing units how such requests are implemented. When a buffer is provided in the local memory MEM attached to a hub, the port addresses for the synchronization are programmed in the hub together with the address range of the buffer at the configuration time, accordingly.

It is noted that in the scheme presented above the local memories MEM are used for buffered IP-to-IP communication in which no data needs to travel to the off-chip SDRAM at all. This is different from the use of the on-chip local memories as a cache for copying data from the off-chip SDRAM into an on-chip local memory MEM for repeated use.

However, the architecture of FIG. 3 could be used to support caching as well, wherein two kinds of caching are distinguished: Transparent caching and IP controlled caching.

With transparent caching, the data processing units IP are not really aware of that data are copied to a local memory MEM, other than that it perceives a different latency in accessing the data. By means of a cache control function, data are copied from/to the off-chip memory SDRAM to/from an on-chip local memory MEM. Such cache control is implemented in a hub. Cache coherency must be resolved either by implementing a hardware cache coherency scheme or by adopting restrictions in the programming model.

With IP-controlled caching, a data processing unit IP itself copies data from the off-chip memory SDRAM to an on-chip local memory for repeated (fine-grain) use. The copies in the on-chip local memory MEM are in a different address range than the corresponding data in the off-chip memory SDRAM. With IP-controlled caching, the data processing units IP are responsible for the coherency. As an example of IP-controlled caching, it may be considered a three-dimensional graphics renderer which 'caches' texture data in an on-chip local memory MEM to perform fine grain accesses on it. This is done by copying the texture data to the address range of the local memory MEM attached to a hub and referring to addresses in that address range when performing the fine grain accesses. In such case, the cache control is performed by the data processing units IP themselves, and this kind of use is different from the transparent use of the on-chip local memory for IP-to-IP communication. Nevertheless, the architecture of FIG. 3 supports this kind of use.

Figure 4:
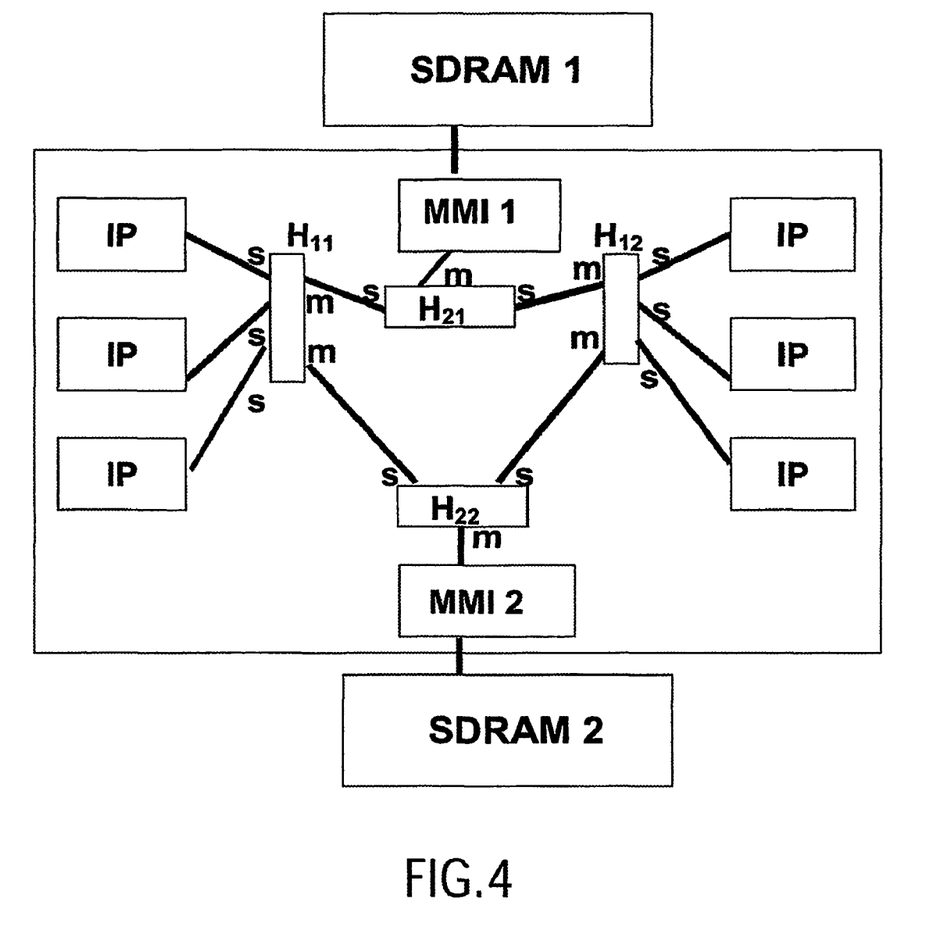
FIG. 4 shows a schematic basic block diagram of a DVP system including a hub structure according to a third preferred embodiment of the present invention.

FIG. 4 shows a third preferred embodiment which differs from the first embodiment of FIG. 2 in that in addition to a first off-chip memory SDRAM 1 and an associated first memory interface MMI 1 coupled thereto a second off-chip memory SDRAM 2 and an associated second memory interface MMI 2 coupled thereto are provided. Further, there are provided a plurality of hubs $H_{11}$, $H_{12}$, $H_{21}$ and $H_{22}$, wherein the hubs $H_{11}$ and $H_{12}$ each comprises several slave ports s and two master ports m and the hubs $H_{21}$ and $H_{22}$ each comprises two slave ports s and one master port m. So, in the system of FIG. 4, the hubs define a network of hubs comprising a first group of hubs $H_{11}$ and $H_{12}$ and a second group consisting of hubs $H_{21}$ and $H_{22}$. The first group of hubs $H_{11}$ and $H_{12}$ define a first level adjacent to the data processing units IP so that the hubs $H_{11}$ and $H_{12}$ of the first group are directly connected to the data processing units IP via its slave ports s. The second group of hubs $H_{21}$ and $H_{22}$ define a second level adjacent to the memory interfaces MMI 1 and MMI 2, wherein the hubs $H_{21}$ and $H_{22}$ each are connected via one of its slave ports to one of the master ports m of the hub $H_{11}$ and further via the other one of its slave ports s to one of the master ports m of the hub $H_{12}$. Moreover, the hub $H_{21}$ is connected via its master port m to the first memory interface MMI 1, and the hub $H_{22}$ is connected via its master port m to the second memory interface MMI 2.

So, in the third embodiment of FIG. 4, the network of hubs is organized as a DAG structure like in the first and second embodiments of FIGS. 2 and 3, respectively, but the data processing units IP have optional access to two off-chip memories SDRAM 1 and SDRAM 2, whereas in the first and second embodiments of FIGS. 2 and 3 there is only communication between a single off-chip memory SDRAM and the data processing units IP. Apart from that two off-chip memories SDRAM 1 and SDRAM 2 are connected to the network of hubs, the operation of the third embodiment of FIG. 4 is the same as that of the first embodiment of FIG. 2 so that reference is made to the description of FIG. 2. Further, in the third embodiment of FIG. 4 local memories and a synchronisation as described in conjunction with FIG. 3 may optionally be provided as well.

As described above, the third embodiment of FIG. 4 comprises two off-chip memories SDRAM 1 and SDRAM 2. However, more than two off-chip memories may be provided as well.

In the above description, it has been presented a next step in the evolution of a multi-processing data system like a DVP platform which allows the use of on-chip local memories MEM to avoid a communication bottleneck to the off-chip memory SDRAM. The use of the local memories MEM for IP-to-IP communication is largely transparent to the data processing units IP.

A further advantage of the above described architecture according to the present invention is that it can be introduced in a stepwise manner. A first chip to adopt the solution can use an on-chip local memory MEM and a new hub (e.g. $H_{12}$) for just a few data processing units IP which want to communicate via such local memory MEM. In later chips, the number of hubs with local memories may gradually rise, and the on-chip communication facilities may be used for more and more IP-to-IP communication.

Although the invention is described above with reference to examples shown in the attached drawings, it is apparent that the invention is not restricted to it but can vary in many ways within the scope disclosed in the attached claims.

The invention claimed is:

1. A data processing system comprising:
   memory device and a plurality of data processors accessing said memory device,
   at least one local memory unit associated with corresponding ones of said plurality of data processors, said local memory unit adapted to be selectively accessed by a memory access request of corresponding ones of said data processors, wherein said memory device and said local memory unit have a single address space and an address range within said single address space distinguishes between a memory access to said memory device and said local memory unit,
   a communication interface coupled between said memory device and said plurality of data processors and said at least one local memory unit, said communication interface including:
   a network of nodes and a memory interface, each node comprising at least one slave port for receiving a memory access request from a data processor or from a previous node and at least one master port for issuing a memory access request to a next node or to said memory device in accordance with the memory access request received at said slave port, wherein a corresponding one of the at least one master port is associated with a corresponding address range, wherein one or more slave ports are connected to a master port of a previous node, or to one of said data processors, and one or more said master ports are connected to the memory interface, wherein the memory interface arbitrates access to the memory device and said at least one local memory unit concurrently through corresponding master ports associated with corresponding address range based on an address associated with the memory access request, wherein the communication interface is positioned on a single chip, and wherein the memory device is not positioned on the single chip; and
   a cache controller, contained within at least one of said nodes, for controlling at least a section of the local memory unit as a cache memory, wherein at least a part of the local memory unit is used to locally store a copy of data residing in other local memories reachable via one of the master ports of the node.

2. The data processing system according to claim 1, wherein at each node the number of said slave ports is higher than the number of said master ports.

3. The data processing system according to claim 1, wherein said network of nodes is hierarchically structured.

4. The data processing system according to claim 3, wherein said network of nodes is arranged in a directed acyclic graph structure.

5. The data processing system according to claim 4, wherein said network of nodes is arranged in a tree structure.

6. The data processing system according to claim 1, wherein said network of nodes include n groups of nodes with $n \geq 2$, wherein each of the slave ports of the nodes of a first group is connected to one of said plurality of data processors, the master ports of the nodes of the $n^{th}$ group are coupled to said memory device, and each of the slave ports of the nodes of the $n^{th}$ group is connected to a master port of the nodes of the $(n-1)^{th}$ group.

7. The data processing system according to claim 1, wherein said nodes are hubs.

8. The data processing system according to claim 1, wherein at least one node further comprises at least one memory port to which a local memory unit is connected.

9. The data processing system according to claim 1, wherein said communication interface further includes at least one synchronization means for streaming communication between data processors.

10. The data processing system according to claim 9, wherein at least one node includes said synchronization means for streaming communication between the data processors directly or indirectly coupled to said nodes.

11. The data processing system according to claim 9, wherein the local memory unit is configured to provide storage based on a first-in/first-out function and said synchronization means comprises a first-in/first-out administration means for controlling said local memory unit.

12. The data processing system according to claim 1, wherein at least a portion of said plurality of data processors is positioned on said single chip.

* * * * *